(No Model.) 2 Sheets—Sheet 1.
J. J. ELLISTON.
COTTON SEED PLANTER.
No. 325,514. Patented Sept. 1, 1885.
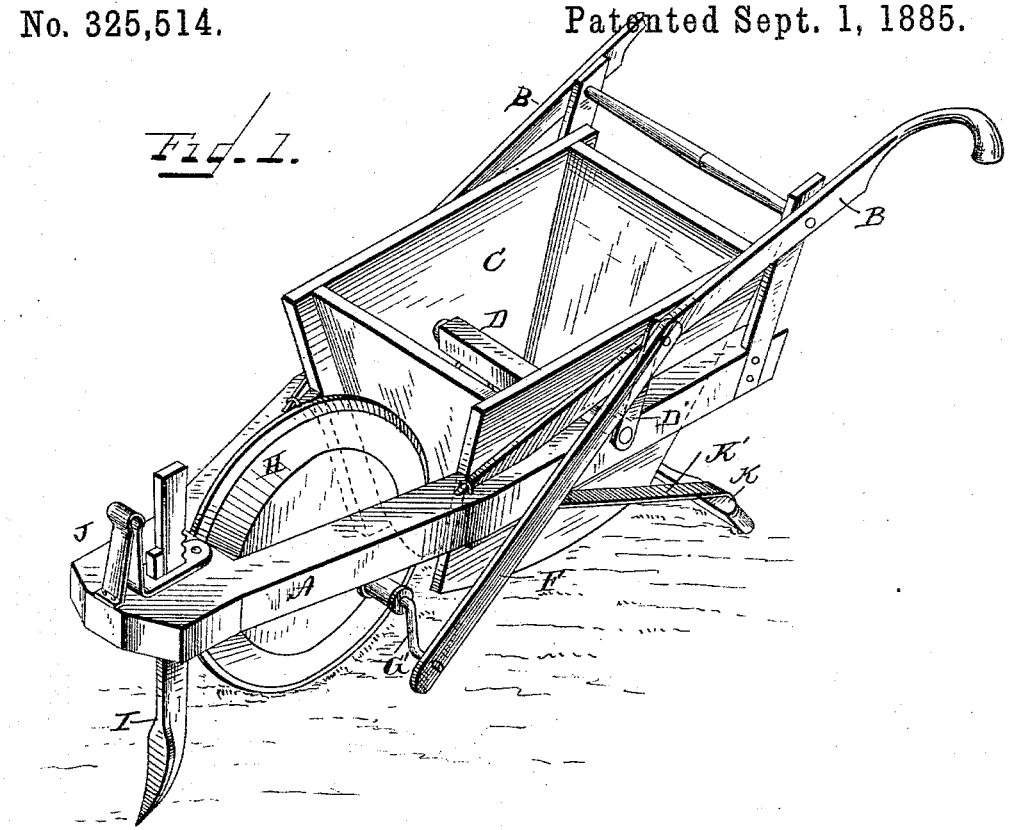
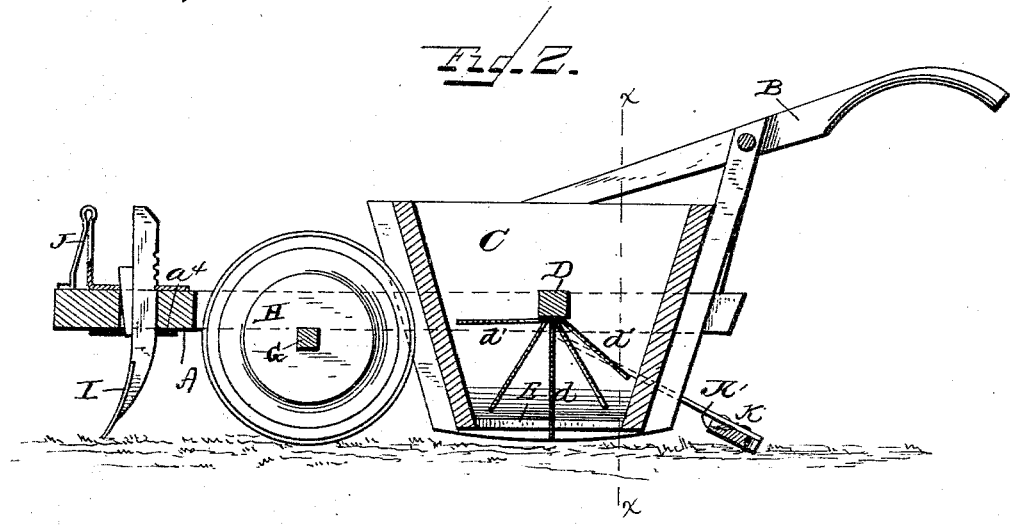
WITNESSES
F. L. Durand,
J. Fred. Reily.
John J. Elliston
INVENTOR,
By Louis Bagger & Co
Attorneys (No Model.)  2 Sheets—Sheet 2.
J. J. ELLISTON.
COTTON SEED PLANTER.
No. 325,514. Patented Sept. 1, 1885.
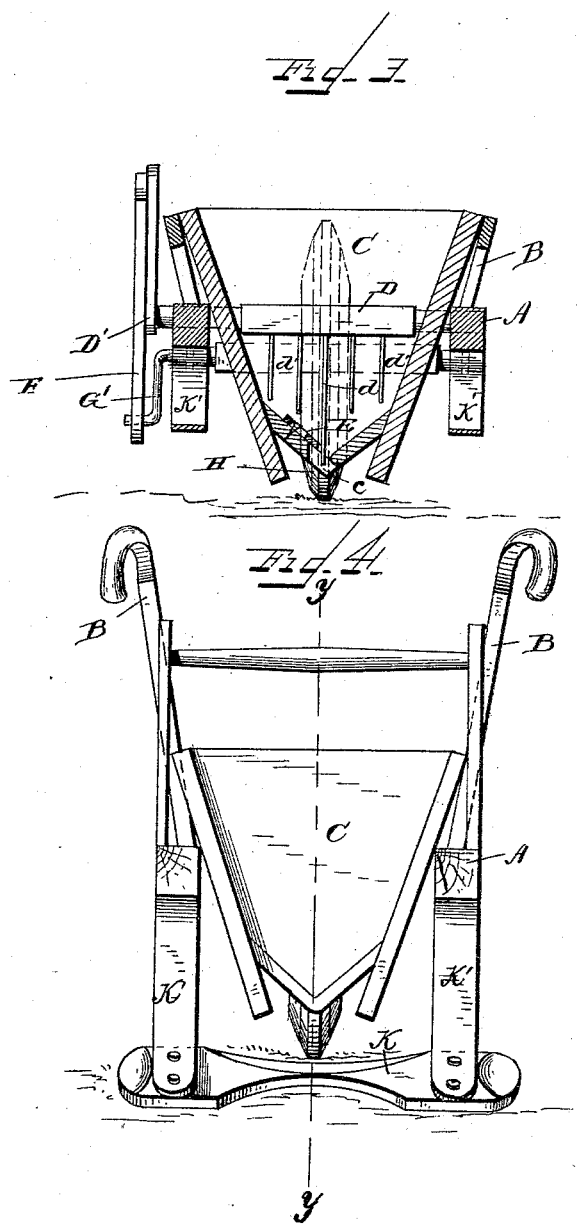
WITNESSES
F. L. Ourand
J. Fred. Reily
John J. Elliston,
INVENTOR
By Louis Bagger & Co,
Attorneys.

UNITED STATES PATENT OFFICE.

JOHN J. ELLISTON, OF HALESBOROUGH, TEXAS.

COTTON-SEED PLANTER.

SPECIFICATION forming part of Letters Patent No. 325,514, dated September 1, 1885.

Application filed July 1, 1885. (No model.)

*To all whom it may concern:*

Be it known that I, JOHN J. ELLISTON, a citizen of the United States, and a resident of Halesborough, in the county of Red River and State of Texas, have invented certain new and useful Improvements in Cotton-Seed Planters; and I do hereby declare that the following is a full, clear, and exact description of the invention, which will enable others skilled in the art to which it appertains to make and use the same, reference being had to the accompanying drawings, which form a part of this specification.

My invention relates to that class of cotton-seed planters in which the cotton-seed in the hopper is fed down through the feed-opening of the same by vibrating teeth, which are mounted upon a crank-shaft which is operated by the drive-wheel through a pitman connecting the crank-arm on the end of the drive-wheel axle with the crank-arm of the shaft upon which the said teeth are mounted; and my invention has for its objects the construction of a cotton-seed planter of the above-described class which shall possess advantages in the points of simplicity of construction and efficiency in operation.

To these ends my invention consists in the improved construction and combination of parts of a cotton-seed planter of the above-described class, which will be hereinafter fully described, and particularly pointed out in the claim.

Referring to the annexed drawings, Figure 1 is a perspective view of my improved cotton-seed planter. Fig. 2 is a longitudinal vertical sectional view of the same, taken on the plane indicated by line $y\ y$, Fig. 4. Fig. 3 is a vertical transverse sectional view taken on the plane indicated by line $x\ x$, Fig. 2, and Fig. 4 is a rear elevation of the planter.

The same letters of reference indicate corresponding parts in all the figures.

Referring to the several parts by letter, A represents the frame which supports in their operative positions the various parts of the planter, and B indicates the handles of the planter, which are secured upon the frame A, as shown.

The hopper C is wedge-shaped both in cross-section and longitudinal section—that is to say, the four walls of the hopper incline toward each other from the top to the bottom of the hopper, so that the space at the lower end of the hopper is less than that at its upper portion, this arrangement serving to feed the seed down toward the discharge or feed opening $c$. The hopper is seated well down in the frame A and handles B, as shown, and the lower ends of the side walls of the same are extended down below the level of the bottom of the hopper, in which the longitudinal slot or feed-opening is located, the said lower ends being curved or rounded to form runners, which slide upon the ground on either side of the furrow, and thereby effectually shield the seed being fed down into the furrow from the action of the wind and prevent its being blown to one side before reaching the furrow, which is liable to occur with hoppers which are hung on or about the same level as the handles.

The feeder consists of the shaft D, having the central teeth, $d$, which work in the feed-slot $c$, and the auxiliary side teeth, $d'$, which work the seed from the sides of the hopper down within reach of the central teeth, $d$, an adjustable slide, E, regulating the amount of seed which is fed through the said feed-opening. The outer end of the shaft D is provided with a crank-arm, D', which is connected by a pitman, F, to the crank-arm G' of the drive-wheel axle G, so that the drive-wheel H operates to reciprocate the feeder.

I indicates the adjustable colter, which is of ordinary construction.

J indicates the metal spring-clevis, through the flat slotted rear extension of which the colter passes, a slotted metal plate, $a^4$, being also secured upon the lower side of the frame A, through which the colter also passes. The spring-clevis is made of band-iron or other suitable metal having the requisite amount of spring, the object of this arrangement being that when the runners of the hopper, upon which it slides, strike against a stone or other obstruction the spring-clevis will yield sufficiently to prevent that sudden jar to the machine which would be caused if the clevis were rigid.

K indicates the coverer, which is connected to the frame A by the spring-rods K', the object of this arrangement being that the said supporting-rods will bend sufficiently to enable the lower end or runners of the hopper to slide upon the ground for the purpose before stated, while they also act, to a certain extent, in conjunction with the spring-clevis, to prevent all jars or sudden concussions.

From the foregoing description, taken in connection with the accompanying drawings, the construction and operation of my improved cotton-seed planter will be readily understood without requiring further explanation.

It will be seen that my improved planter is compact in form and exceedingly simple in construction, so that it can be made in any country workshop, and is entirely devoid of all complicated mechanism, which is liable to break or get out of order. By arranging the hopper in the manner shown and described it will be seen that the seed are effectually prevented from being blown away by the wind before entering the furrow, while the spring-clevis operates, as described, to prevent any sudden jar or concussion.

Having thus described my invention, what I claim, and desire to secure by Letters Patent of the United States, is—

As an improvement in cotton-seed planters, the combination, with the main frame, of the hopper having the inclined sides extending down to a point below the level of the feed-opening and curved to adapt them to act as runners, and the feeder and means for operating the same, substantially as set forth.

In testimony that I claim the foregoing as my own I have hereunto affixed my signature in presence of two witnesses.

JOHN J. ELLISTON.

Witnesses:
C. T. AMASON,
S. P. SHI.